May 6, 1969  A. F. OLSON  3,442,526
TRACTOR MOWER

Filed March 24, 1967  Sheet 1 of 3

INVENTOR
ALVIN F. OLSON
BY Robert M. Dannig
ATTORNEY

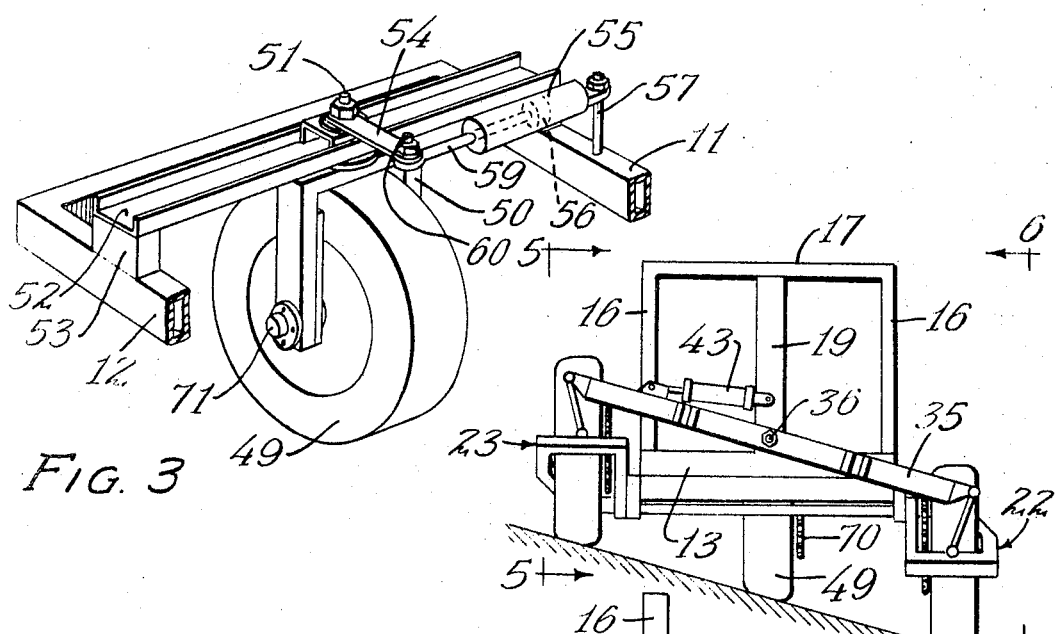
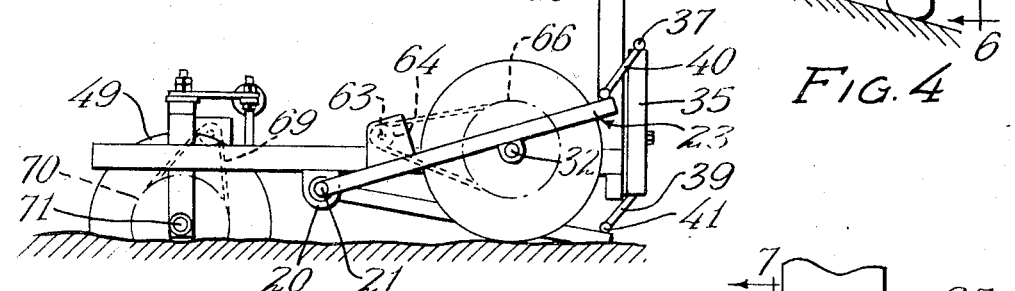
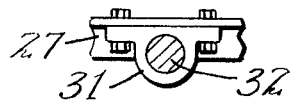
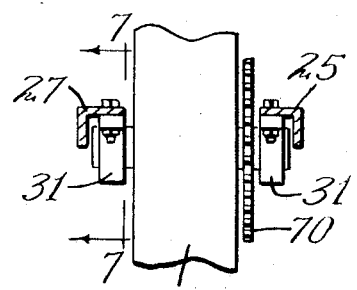
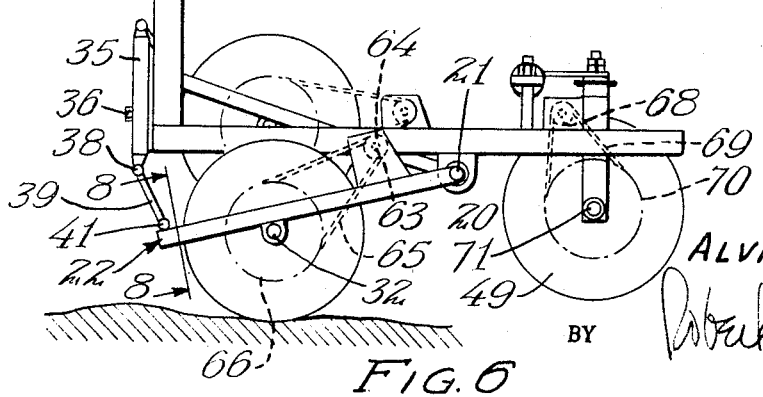

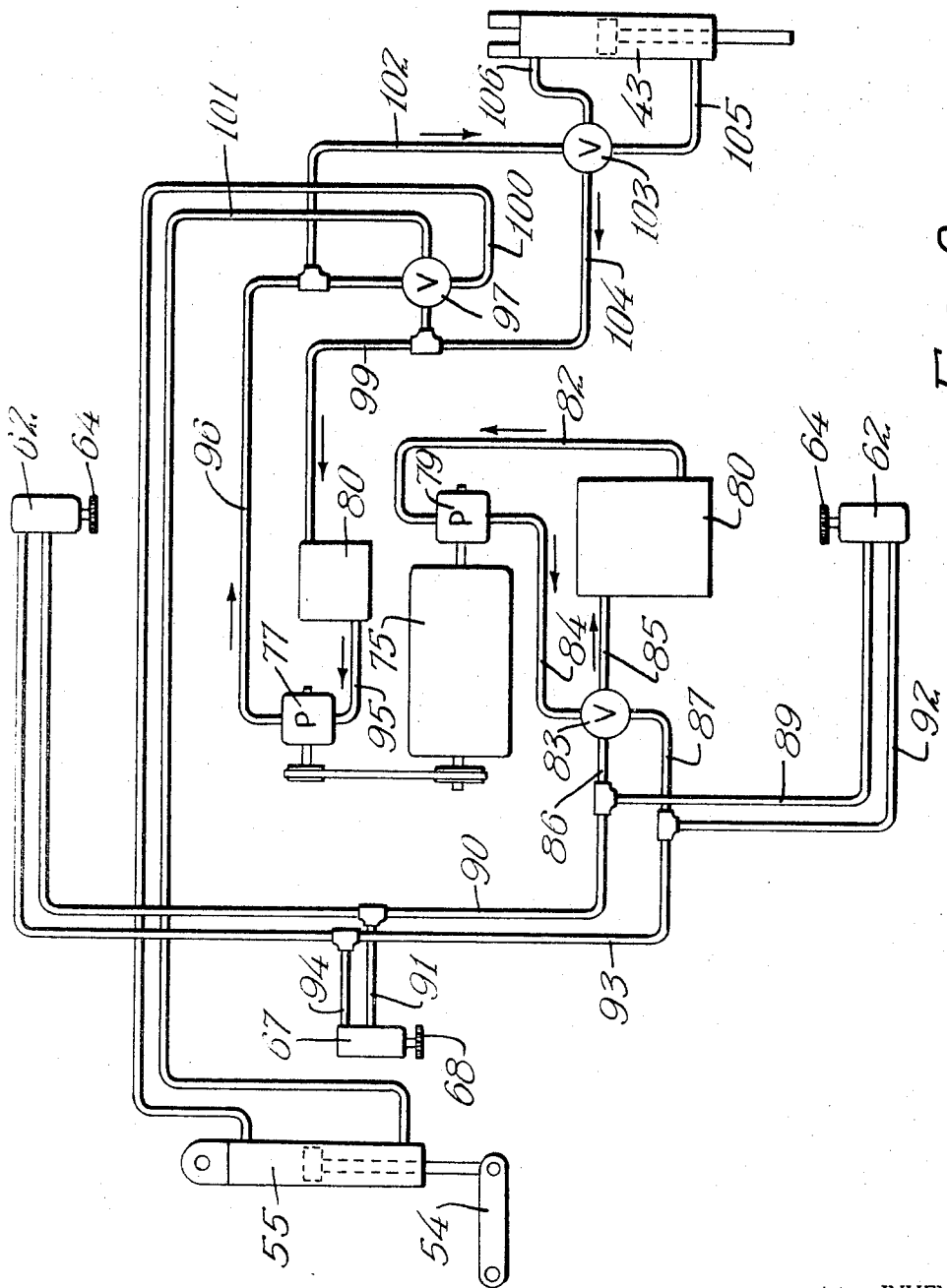

United States Patent Office 3,442,526
Patented May 6, 1969

3,442,526
TRACTOR MOWER
Alvin F. Olson, Rte. 2, New Richmond, Wis. 54017
Filed Mar. 24, 1967, Ser. No. 625,792
Int. Cl. B60g 3/26
U.S. Cl. 280—43.13                                10 Claims

ABSTRACT OF THE DISCLOSURE

The device comprises a vehicle useful in traveling along side hills for mowing grass and the like. A pair of opposed wheels are mounted at the ends of arms pivoted on a common transverse axis. The free ends of the arms are link connected to a transverse cross member hinged centrally to the vehicle body so that as one wheel raises the other lowers. Means are provided for actuating the cross-member.

---

This invention relates to an improvement in tractor mowers and deals particularly with a tractor capable of maintaining a generally upright position when traveling along the side of a hill or the like.

During recent years, it has become increasingly popular to landscape the sides of hills, particularly along freeways and the like which must often be built above the level of the surrounding land or below the level thereof. Grass is grown along the slopes on either side of the highway, and it is necessary to mow this grass at least several times each summer. When the slope exceeds a certain angle, the only way in which the grass may be mowed is by mowers traveling up and down the embankment rather than parallel to the highway, a process which is slow and difficult. Thus it is extremely desirable to have a motive power capable of moving along the sides of the hill without becoming overbalanced. It is an object of the present invention to provide such a device.

A feature of the present invention resides in the provision of a tractor in which at least one pair of wheels is supported by yokes or arms pivotally supported at a longitudinally spaced axis to a transverse pivot support which is generally horizontal when the tractor is on level ground. The arrangement is such that when one wheel may be swung downwardly while the wheel on the opposite side of the tractor is swung upwardly, permitting movement of the tractor along the side of the hill.

A further feature of the present invention resides in the provision of a novel means of raising and lowering the wheels on opposite sides of the tractor in unison. To accomplish this result, a cross-member is provided which is pivoted centrally to an axis which extends longitudinally of the tractor. The opposite ends of this cross-member are connected by suitable links to the yokes or arms which support the wheels. A pivotal movement of the cross-member about the longitudinal axis acts through the links to lower the yoke or wheel support on one side of the tractor and simultaneously raise the yoke or wheel support on the opposite side of the tractor. Thus when a wheel on one side of the tractor is lowered a distance of six inches, the opposite wheel is raised a similar distance, permitting the tractor to be level when there is a difference of one foot in elevation in the ground upon which the two wheels rest.

A further feature of the present invention resides in the provision of a simple and effective means of pivoting the cross-member. A hydraulic cylinder is connected between the cross-member and a fixed point of the tractor capable of pivoting the cross-member about its central longitudinal axis.

In the simplest form of construction, the tractor is of the tricycle type with a central wheel at one end midway between the planes of the other two wheels, and which may be used for steering purposes. However, by providing means for steering the tractor, wheels at both ends of the tractor may be raised and lowered simultaneously.

These and other objects and novel features of the present invention will be more clearly and fully set forth in the following specification and claims.

In the drawings forming a part of the specification,

FIGURE 3 is a perspective view of a detail portion of the rear end of the tractor showing the manner in which the tractor is steered.

FIGURE 4 is a front elevational view in diagrammatic form showing the manner in which the wheels of the tractor are pivoted about a horizontal axis.

FIGURE 5 is a diagrammatic side elevational view of the tractor frame and wheels, the position of the view being indicated by the line 5—5 of FIGURE 4.

FIGURE 6 is a diagrammatic elevational view showing the frame and wheels of the tractor, the position of the view being indicated by the line 6—6 of FIGURE 4.

FIGURE 7 is a vertical sectional view through one of the yokes supporting one of the front wheels.

FIGURE 8 is a sectional view showing the manner in which the front wheels are supported, the position of the section being indicated by the line 8—8 of FIGURE 6.

FIGURE 9 is a diagrammatic view showing the hydraulic operating system of the tractor.

Figure 1:
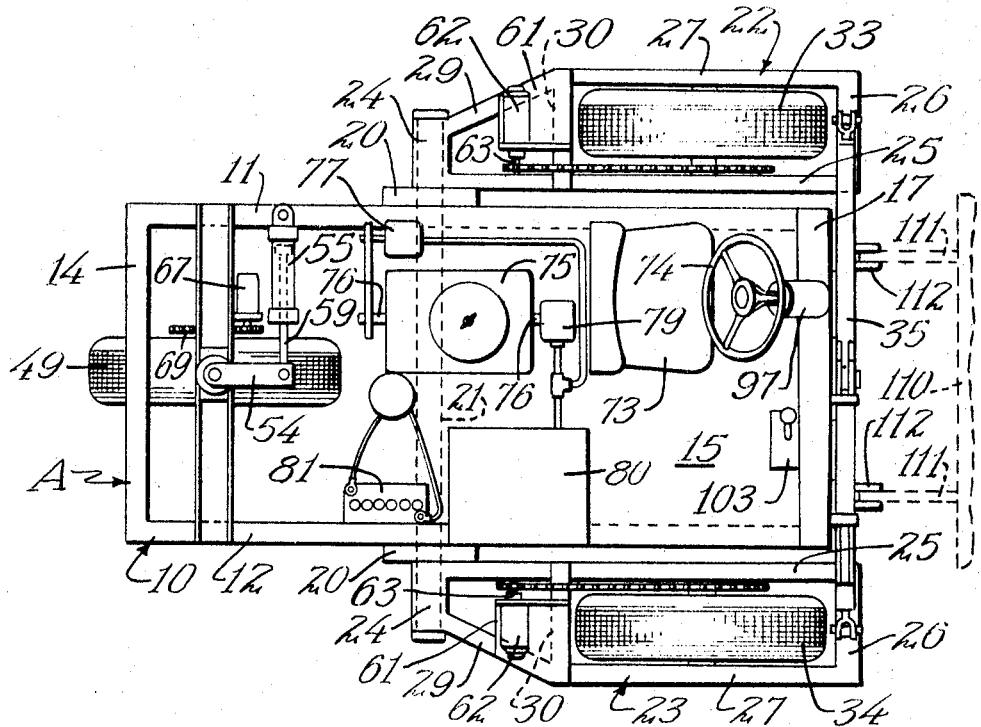
FIGURE 1 is a top plan view of a tractor device showing the general arrangement of parts therein.

While the device has been described as a tractor mower, the actual mower element is not illustrated as mower constructions are well known in the art and may comprise any one of a number of different types. Furthermore, in view of the fact that the body of the tractor as well as the tractor engine may vary considerably in the form, this motor is more or less diagrammatically illustrated.

The tractor A includes a generally rectangular frame 10 including a pair of generally parallel frame sides 11 and 12, and forward and rear frame ends 13 and 14 interconnecting the frame sides 11 and 12. A platform such as 15 is supported by the forward end of the frame, and is shown as acting as a support for various of the elements. An upright generally rectangular frame including a pair of laterally spaced uprights 16 and a cross-connecting member 17 is mounted on the forward end of the frame 10. An intermediate upright 19 extends between the frame member 13 and the cross-connecting member 17 intermediate the uprights 16 as is perhaps best illustrated in FIGURES 2 and 4 of the drawings.

A pair of opposed bearings 20 extend downwardly from the frame, one being supported by each of the frame sides 11 and 12. A shaft 21 is supported by the bearings 20, the shaft extending transversely of the frame 10 intermediate the ends thereof. The ends of the shaft 21 support a pair of yokes 22 and 23 having journals 24 at one end thereof encircling the shaft 21. Each of the yokes 22 and 23 includes an inner frame member 25 which extends in parallel spaced relation to the adjacent frame side 11 or 12, a right angularly extending front end portion 26, and an outer side member 27 which is in spaced parallel relation to the frame side 25. The frame member 27 is connected at its forward end to the front end portion 26, and is connected at its rear end by an inwardly angled portion 29 to the journal 24. A cross brace 30 extends parallel to the front end portion 26 to connect the frame sides 25 and 27. This provides a generally rectangular opening in each yoke.

Bearings 31 are provided on the undersurface of the frame sides 25 and 27, these bearings 31 supporting wheel axles 32 on which are mounted wheel rims which support the tires, the wheel in the frame side 22 being indicated at 33, and the wheel in the yoke 23 being indicated by the numeral 34.

Figure 2:
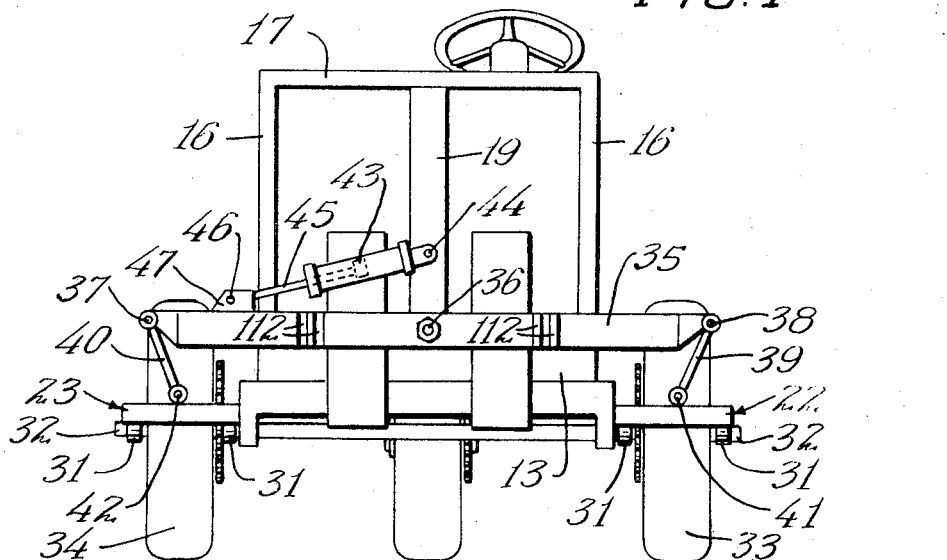
FIGURE 2 is a front elevational view of the structure illustrated in FIGURE 1.

As indicated in FIGURES 2 and 4 of the drawings, a crossbar 35 is centrally pivoted as indicated at 36 to the central upright 19 forming a part of the upright frame at the front of the tractor. The crossbar 35 is provided at each of its ends with a universal joint socket, the sockets being indicated at 38 and 37. These sockets are connected by links 39 and 40 to universal joint sockets 41 and 42 on the front cross members 26 of the yokes 22 and 23 respectively. Accordingly, a pivotal movement of the crossbar 35 in a clockwise direction will act through the links 39 and 40 to lower the forward end of the yoke 22 and tire 33, and to raise the forward end of the yoke 23 and tire 34. In the same manner, a pivotal movement of the crossbar 35 in a counter-clockwise direction will act to lower the yoke 23 supporting the tire 34 and to raise the forward end of the yoke 22 raising the tire 33.

In order to pivot the crossbar 35 about its axis, a hydraulic cylinder including a piston is indicated at 43 having an end of the cylinder pivoted at 44 to the frame upright 19 at a point spaced above the pivot 36. The piston rod 45 which is actuated by the piston within the cylinder 43 is pivotally connected at 46 to suitable lugs 47 on the cross member 35. By moving the piston within the cylinder in one direction or the other, the crossbar 35 may be pivoted in either a clockwise or counter-clockwise direction, the yokes 22 and 23 pivoting upwardly or downwardly about the axis of the shaft 21.

In the particular arrangement illustrated, the apparatus is of the tricycle type having a single rear wheel 49 which is mounted in a bifurcated yoke 50 as is best illustrated in FIGURE 3 of the drawings.

The yoke 50 is provided with a central vertical pivot shaft 51 which extends through a transverse frame member 52 connected between the frame sides 11 and 12. The cross member 52 is held above the level of the frame by a spacing block such as 53. An arm 54 is mounted upon the shaft 51 and is designed to pivot in unison with the yoke 50 and wheel 49. A cylinder 55 including a piston 56 is connected between the arm 54 and the frame. The cylinder 55 is connected to a vertical pivot 57 projecting upwardly from the frame side 11, and the piston 56 has its piston rod 59 pivotally connected at 60 to the forward end of the arm 54. Thus the wheel may be pivoted about the axis of the vertical shaft 51 by movement of the piston 56 in the cylinder 55.

In the particular arrangement illustrated, the wheels are driven hydraulically. Platforms 61 are supported on each of the yokes 22 and 23 to support a hydraulic motor 62. The motor shaft 63 of each motor 62 supports a sprocket 64 which is connected by a chain 65 to a larger sprocket 66 on each wheel axle 32. Thus both of the wheels 33 and 34 are driven by suitable hydraulic motor means.

The yoke 50 of the rear wheel 49 also supports a hydraulic motor 67, the operating shaft of which is connected by a suitable chain 69 to a sprocket 70 on the wheel axle 71 pivotally supporting the wheel 49 to the yoke 50. The drive shaft of the motor 67 is provided with a relatively small drive sprocket 68.

FIGURE 1 of the drawings diagrammatically illustrates a seat 73 mounted upon the platform 15 for the operator of the tractor, and a steering wheel 74 forwardly of the driver's seat 73. The wheel 74 actually controls a hydraulic circuit to the steering cylinder 43, as will be described. The platform 15 also supports a suitable drive engine 75, the drive shaft 76 of which acts to drive a pair of pumps 77 and 79. A hydraulic fluid reservoir 80 is also supported, as well as the engine battery 81.

FIGURE 9 of the drawings diagrammatically illustrates the hydraulic circuit. The motor 75 drives the pump 79 which draws fluid through the conduit 82 from the reservoir 80 and to a valve 83 which acts to direct the hydraulic fluid pump through the conduit 84 either to the conduit 85 leading back to the reservoir 80, to the conduit 86, or to the conduit 87. The conduit 86 communicates with a conduit 89 leading to one hydraulic motor 62, a conduit 90 leading to the other hydraulic motor 62, and a conduit 91 leading to the rear wheel drive motor 67. The conduit 87 communicates with a first conduit 92 leading to the hydraulic motor 62 on one side of the frame, the conduit 93 leading to the similar motor 62 on the other side of the frame, and a conduit 94 leading to the rear wheel motor 67. As will be understood, when the valve 83 directs the fluid from the pump 79 through the conduit 86, both motor 62 and the motor 67 are driven in one direction, and the fluid from the conduit 87 may return through the valve 83 and the conduit 85 to the reservoir 80. Similarly, when the valve 83 directs fluid to the conduit 87, the wheels are driven in the opposite rotative direction, and the fluid from the conduit 86 may return through the valve 83 and the conduit 85 to the reservoir 80.

The motor 75 also drives the pump 77 which draws fluid from the reservoir 80 through a conduit 95 to the pump intake, and from the pump through a conduit 96 to a manually operable valve 97 which is controlled by rotation of the steering wheel 74. The valve 97 may direct the fluid under pressure back to the reservoir 80 through a return line 99. The fluid under pressure may also be directed either to the conduit 100 leading to one end of the cylinder 43, or to the conduit 101 leading to the opposite end thereof. When fluid is directed to the conduit 100, the conduit 101 is connected through the valve 97 to the return line 99. When the fluid under pressure is directed to the conduit 101, conduit 101 is connected to the return line 99 through the valve 97.

The pressure line 96 is also connected by a pressure conduit 102 to a manually controlled valve 103. The valve 103 is capable of directing the fluid under pressure to a conduit 104 leading to the return line 99 to return the fluid to the reservoir 80. The valve 103 may direct fluid from the conduit 102 to a conduit 105 leading to one end of the cylinder 43. The other end of the cylinder is provided with a conduit 106 leading back to the valve 103 and which is at this time connected to the return line 104. When the valve 103 directs fluid through the conduit 106, the conduit 105 is connected to a return line 104.

From the foregoing description, it will be evident that the tractor is moved along the ground when the engine 75 is in operation, the movement being controlled by the vave 83. The steering of the tractor is controlled by the valve 97 which preferably is connected to the steering wheel 74 so that the valve is open to direct fluid to one side or the other of the steering cylinder 43. As the vehicle travels along the side of a hill or embankment, the body may be leveled by operation of the valve 103 which pivots the crossbar 35 about its central pivot 36, raising the wheel on one side of the tractor and lowering the wheel on the opposite side thereof, as is indicated in FIGURE 4 of the drawings. The mower unit for which the tractor is often used is indicated in broken lines at 110 in FIGURE 1 of the drawings, the mower unit being pushed by a pair of arms 111 supported by lugs 112 on the cross-member 35. By connecting the mower unit 110 to the crossbar 35, the mower may be pushed more readily in view of the fact that the crossbar 35 is designed to remain substantially parallel to the ground while the body of the tractor is vertical.

In accordance with the Patent Office statutes, I have described the principles of construction and operation of my improvement in tractor mower, and while I have endeavored to set forth the best embodiment thereof, I desired to have it understood that changes may be made

I claim:
1. A tractor device including an elongated frame,
   wheel means supporting one longitudinal end of said frame,
   a pair of wheel supports hingedly connected to opposite sides of said frame on a common transverse axis,
   a wheel supported by each of said wheel supports in spaced relation to said common axis, and on an axis parallel thereto,
   means for pivoting said wheel supports about said common axis to raise or lower the wheel supported thereby, and
   means connecting said wheel supports for simultaneously pivoting them in opposite directions.
2. The structure of claim 1 and including means for simultaneously swinging said wheel supports in opposite directions to lower one wheel and to raise the other.
3. The structure of claim 1 and including a cross member hingedly connected to said frame on a central longitudinal axis, and means connecting opposite ends of said cross member to said wheel supports.
4. The structure of claim 3 and in which said connecting means comprises a pair of links pivoted at one end to said cross member and at the opposite end to a corresponding wheel support.
5. The structure of claim 1 and in which each said wheel support comprises a yoke extending on opposite sides of the wheel supported thereby.
6. The structure of claim 3 and in which the means for raising and lowering said wheel supports comprises an expansible and contractable member connected between said frame and said cross member.
7. The structure of claim 1 and in which said wheel supports raising and lowering means and said wheel driving means are hydraulically operated.
8. The structure of claim 1 and in which said wheel means comprises a caster type wheel hingedly suported by said frame on a longitudinal plane intermediate the planes of said wheels.
9. The structure of claim 8 and including steering means for pivoting said caster type wheel about a vertical axis.
10. The structure of claim 1 and in which said common axis is intermediate the axes of said wheel means and said wheels.

References Cited

UNITED STATES PATENTS

| | | | |
|---|---|---|---|
| 3,029,088 | 4/1962 | Loef | 280—62 |
| 3,091,476 | 5/1963 | Blake. | |
| 3,160,221 | 12/1964 | Boone | 280—6.11 |

BENJAMIN HERSH, *Primary Examiner.*

JOEL E. SIEGEL, *Assistant Examiner.*